(12) United States Patent
Lassen

(10) Patent No.: US 7,183,734 B2
(45) Date of Patent: Feb. 27, 2007

(54) SENSORLESS CONTROL OF TWO-PHASE BRUSHLESS DC MOTOR

(75) Inventor: Jacob L. Lassen, Saupstad (NO)

(73) Assignee: Atmel Corporation, San Jose, CA (US)

( * ) Notice: Subject to any disclaimer, the term of this patent is extended or adjusted under 35 U.S.C. 154(b) by 0 days.

(21) Appl. No.: 11/061,794

(22) Filed: Feb. 18, 2005

(65) Prior Publication Data

US 2006/0186846 A1 Aug. 24, 2006

(51) Int. Cl.
*H02P 7/50* (2006.01)

(52) U.S. Cl. .................. 318/439; 318/245; 318/138; 318/254

(58) Field of Classification Search ......... 318/245, 318/254, 471, 798, 138, 439; 388/805, 831; 417/42
See application file for complete search history.

(56) References Cited

U.S. PATENT DOCUMENTS

| | | | | |
|---|---|---|---|---|
| 4,928,043 A | * | 5/1990 | Plunkett | 318/254 |
| 5,017,845 A | | 5/1991 | Carobolante et al. | 318/138 |
| 5,182,499 A | | 1/1993 | Inaji et al. | 318/254 |
| 5,206,567 A | | 4/1993 | Sakurai et al. | 312/254 |
| 5,343,127 A | | 8/1994 | Maiocchi | 318/254 |
| 5,672,948 A | | 9/1997 | Cohen et al. | 318/603 |
| 5,731,670 A | | 3/1998 | Galbiati et al. | 318/254 |
| 5,783,917 A | | 7/1998 | Takekawa | 318/439 |
| 5,886,485 A | | 3/1999 | Jang | 318/254 |
| 5,998,946 A | | 12/1999 | Kim | 318/254 |
| 6,018,225 A | * | 1/2000 | Garces | 318/798 |
| 6,163,119 A | | 12/2000 | Jeong | 318/254 |
| 6,181,093 B1 | | 1/2001 | Park et al. | 318/254 |
| 6,459,230 B1 | * | 10/2002 | Tao | 318/798 |
| 6,481,974 B2 | * | 11/2002 | Horng et al. | 417/42 |
| 6,483,270 B1 | | 11/2002 | Miyazaki et al. | 318/700 |
| 6,940,235 B2 | * | 9/2005 | Getz et al. | 318/254 |
| 6,949,900 B1 | * | 9/2005 | Berringer | 318/254 |
| 2002/0110457 A1 | * | 8/2002 | Horng et al. | 417/42 |
| 2003/0006724 A1 | * | 1/2003 | Getz et al. | 318/254 |
| 2003/0231875 A1 | | 12/2003 | Masino | 388/928.1 |
| 2005/0002657 A1 | * | 1/2005 | Wu et al. | 388/831 |
| 2005/0047761 A1 | * | 3/2005 | Babb et al. | 388/805 |
| 2005/0110442 A1 | * | 5/2005 | Trifilo | 318/254 |
| 2005/0258789 A1 | * | 11/2005 | Getz et al. | 318/254 |
| 2005/0264250 A1 | * | 12/2005 | Lee | 318/471 |

\* cited by examiner

*Primary Examiner*—Paul Ip
(74) *Attorney, Agent, or Firm*—Schneck & Schneck; Thomas Schneck

(57) ABSTRACT

A motor control system for a two-phase brushless DC motor uses measured EMF voltage from the passive set of stator coils to control commutation. A microcontroller receives the EMF voltage measurement and compares it to a threshold voltage value, which may be speed-dependent for advance commutation at high motor speeds. A match of the EMF voltage measurement with the threshold value triggers commutation of the drive to the opposite set of stator coils. The microcontroller also has an up-down counter timer whose count value is compared to an external speed reference. Each match of the count value triggers a transition in a pulse-width modulated (PWM) drive signal. The duty cycle of the PWM signal establishes an average drive voltage that controls motor speed.

21 Claims, 11 Drawing Sheets

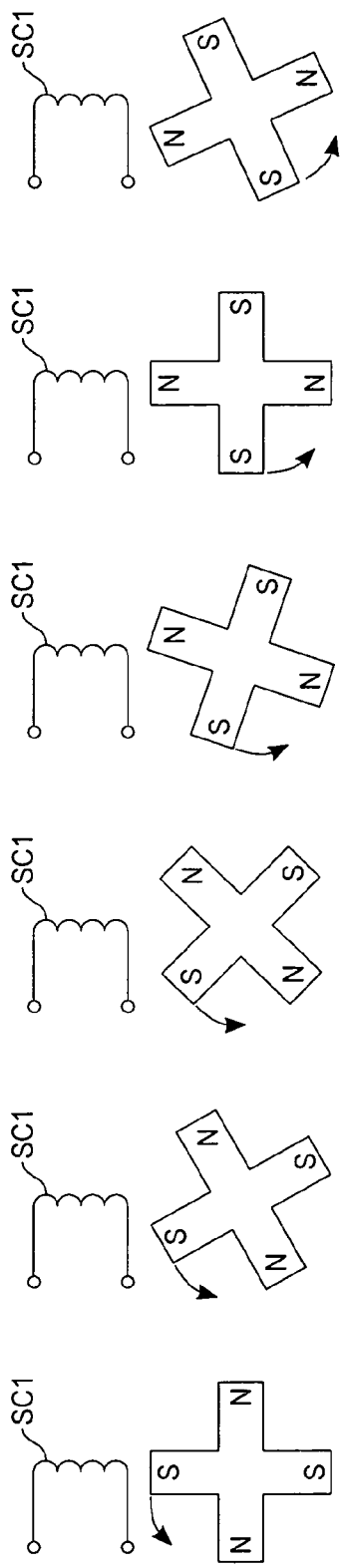
Fig._2A  Fig._2B  Fig._2C  Fig._2D  Fig._2E  Fig._2F
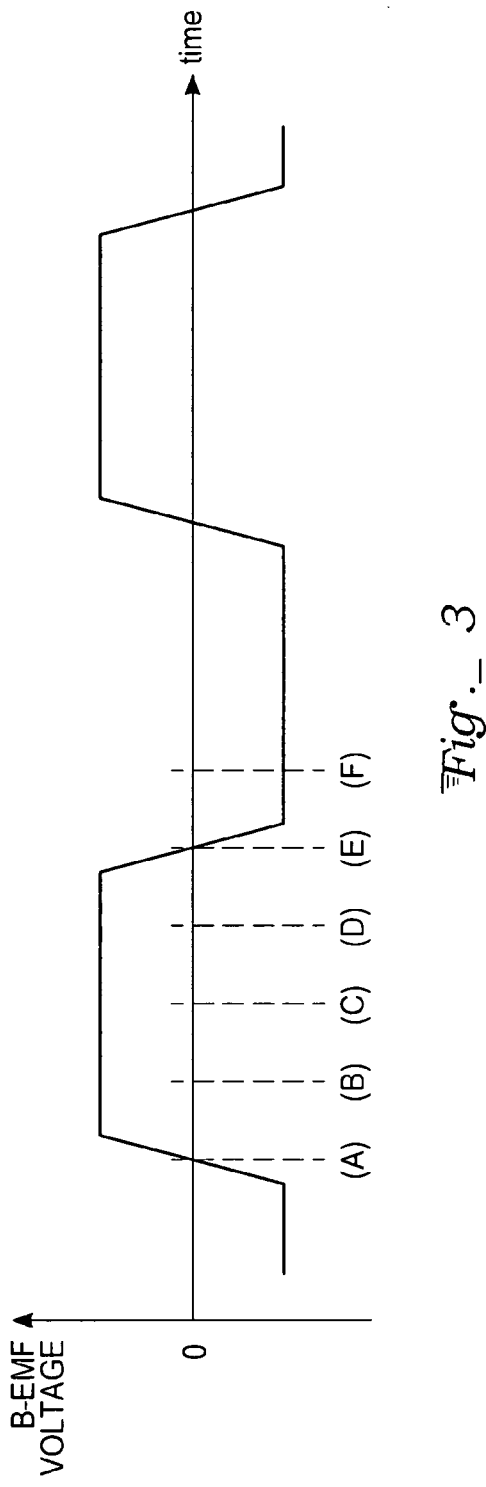
Fig._3

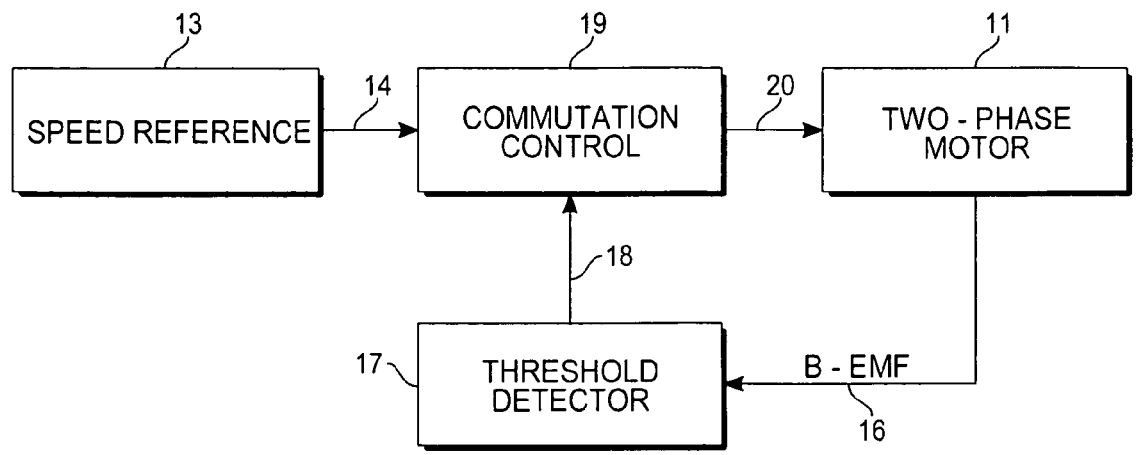
Fig._4
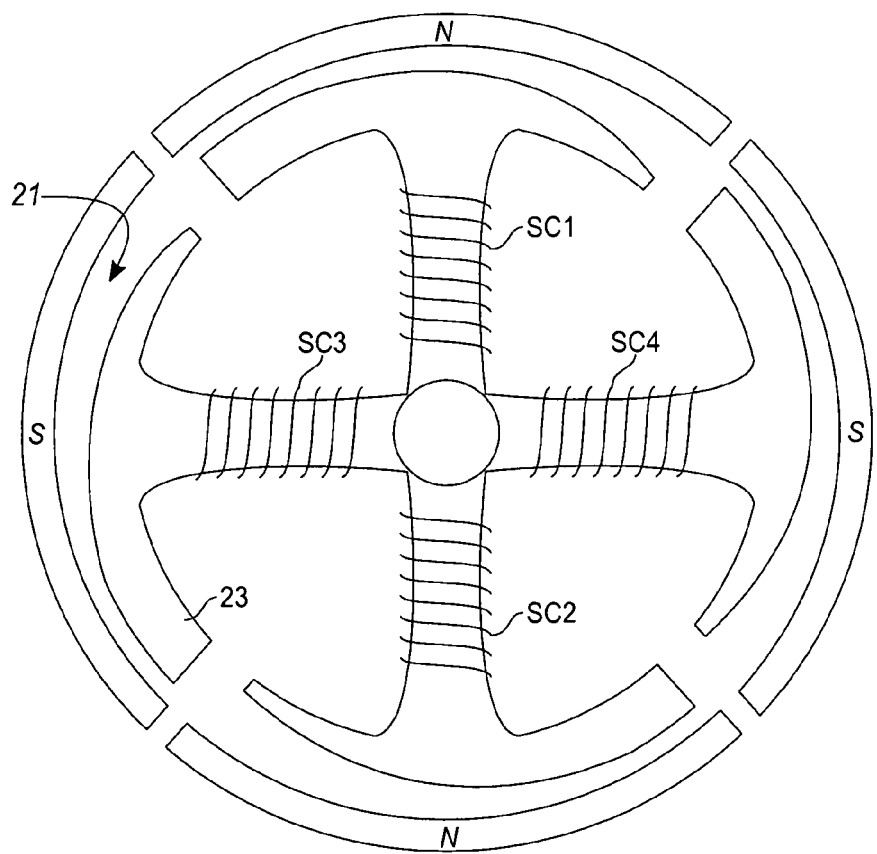
Fig._5 (Prior Art)

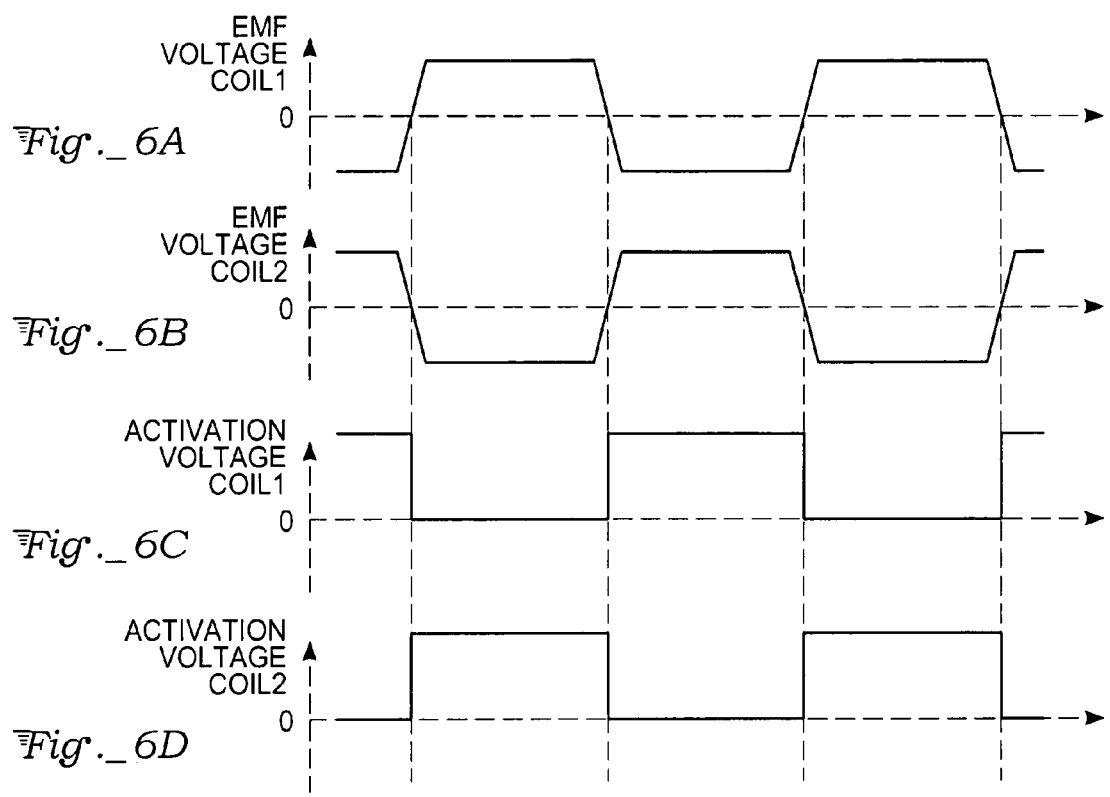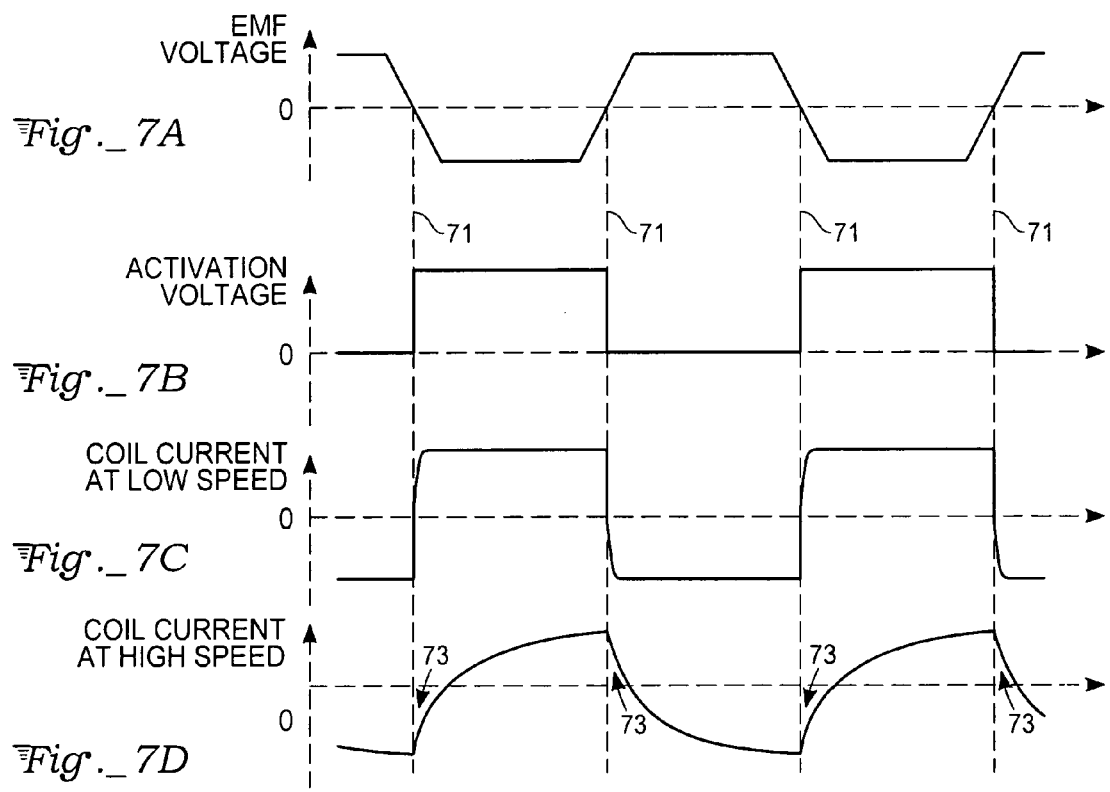

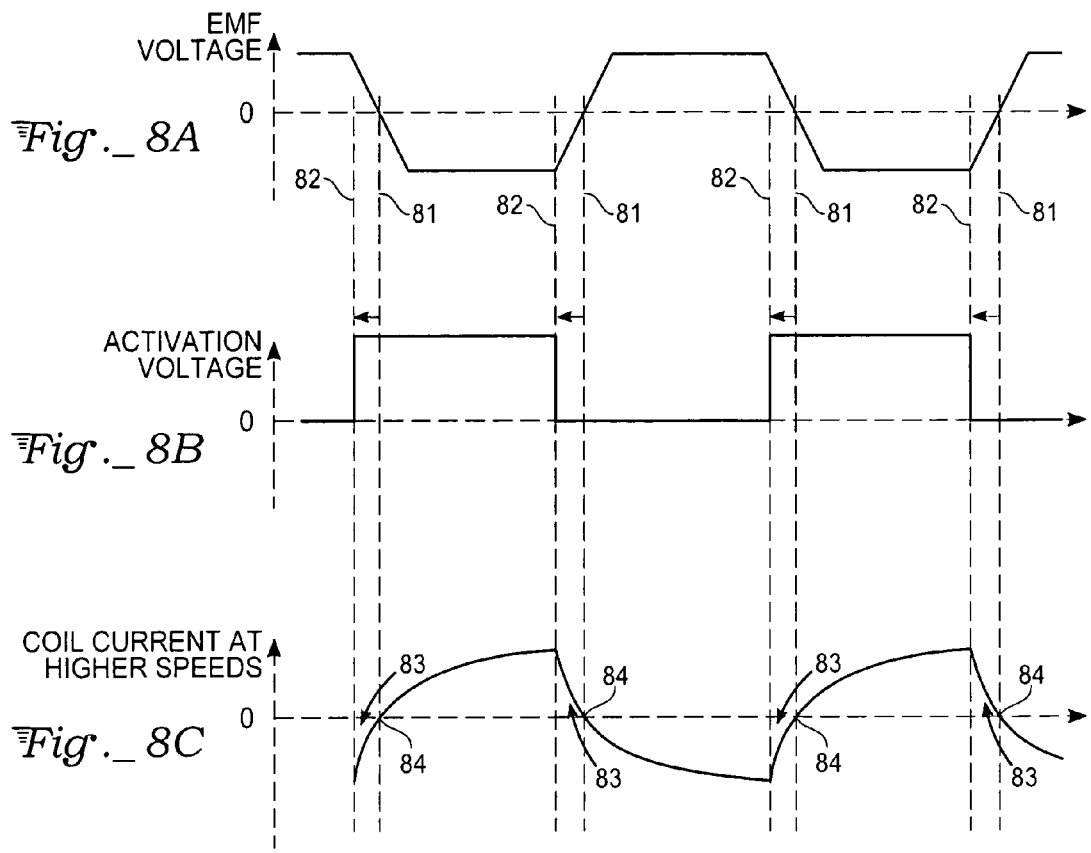
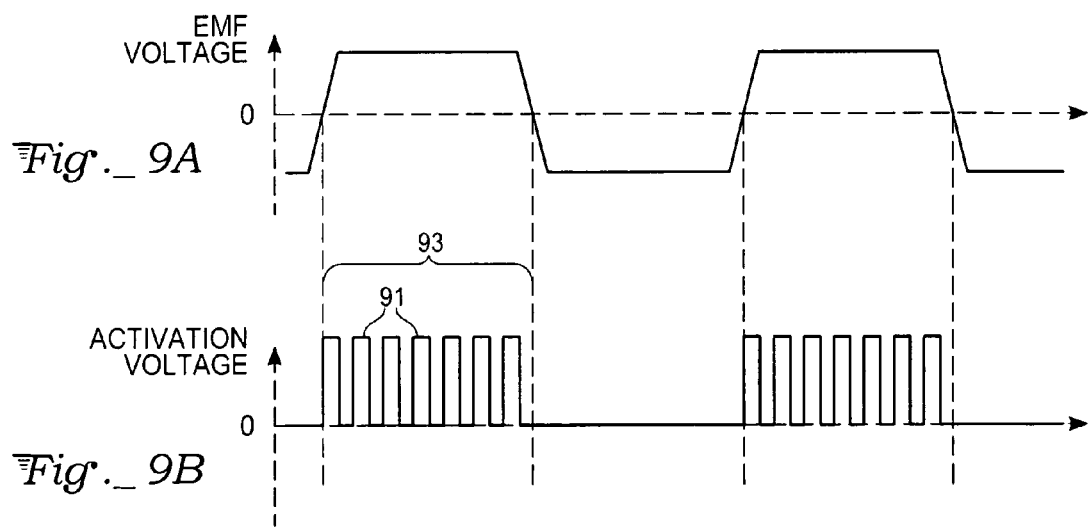

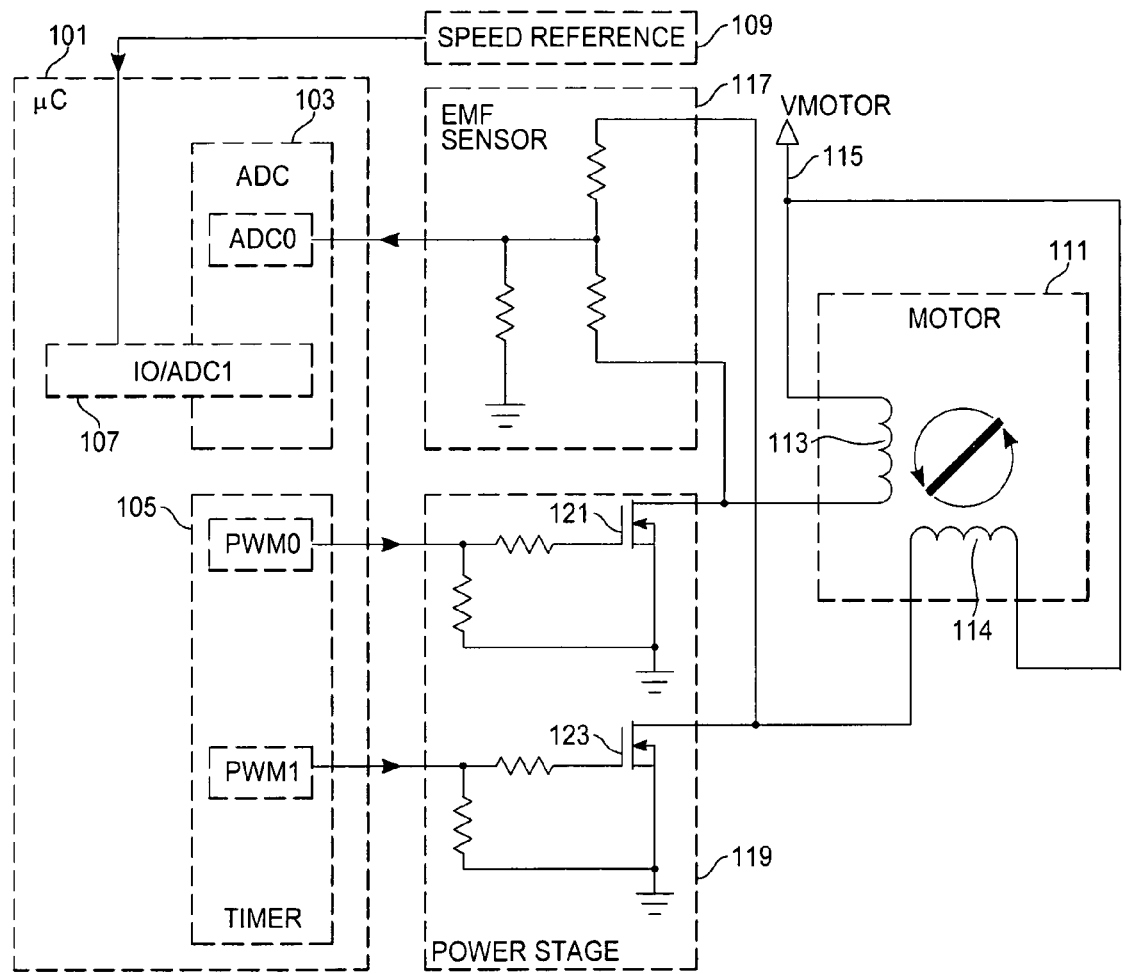
Fig. _ 10

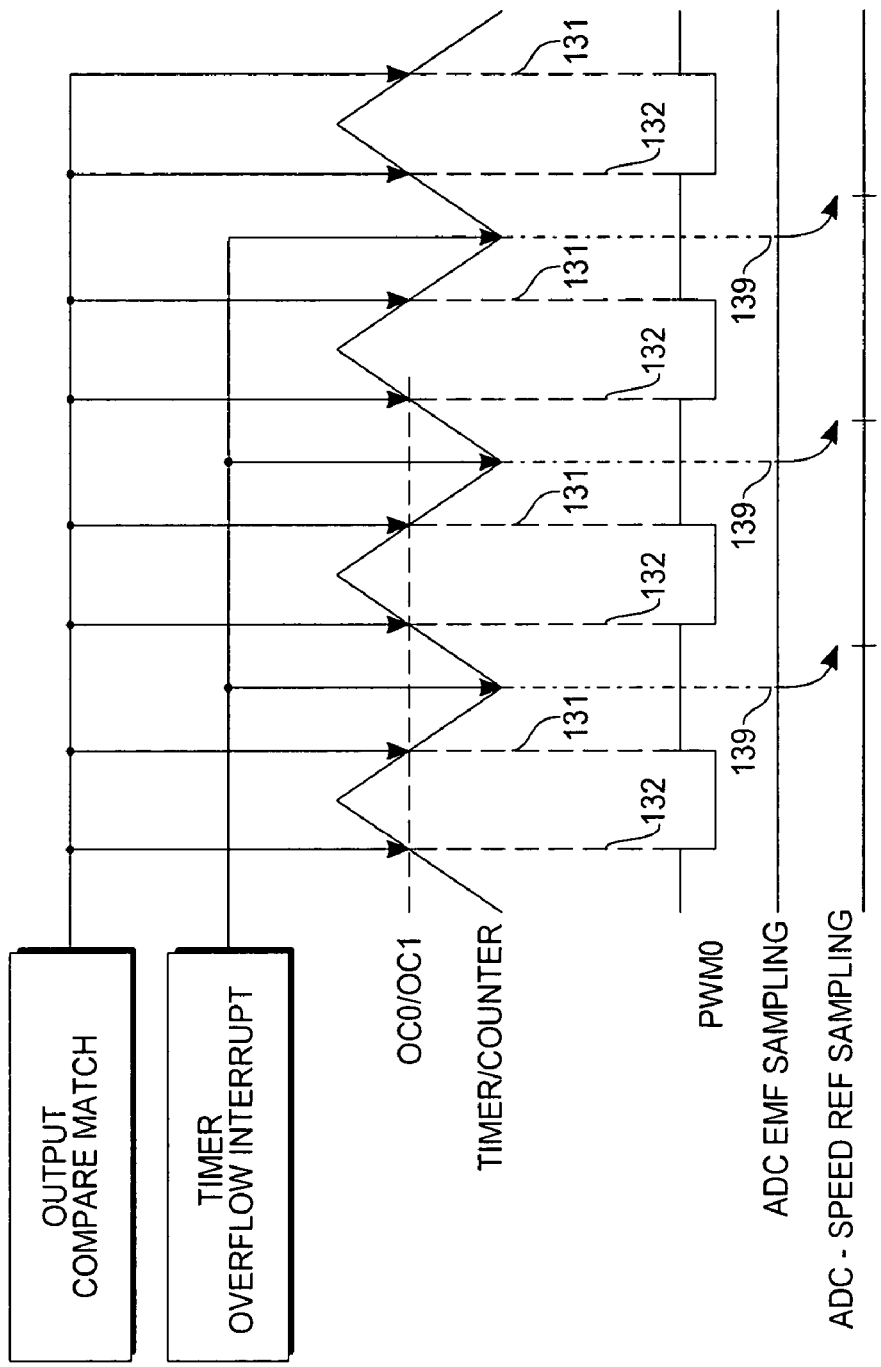
Fig._11

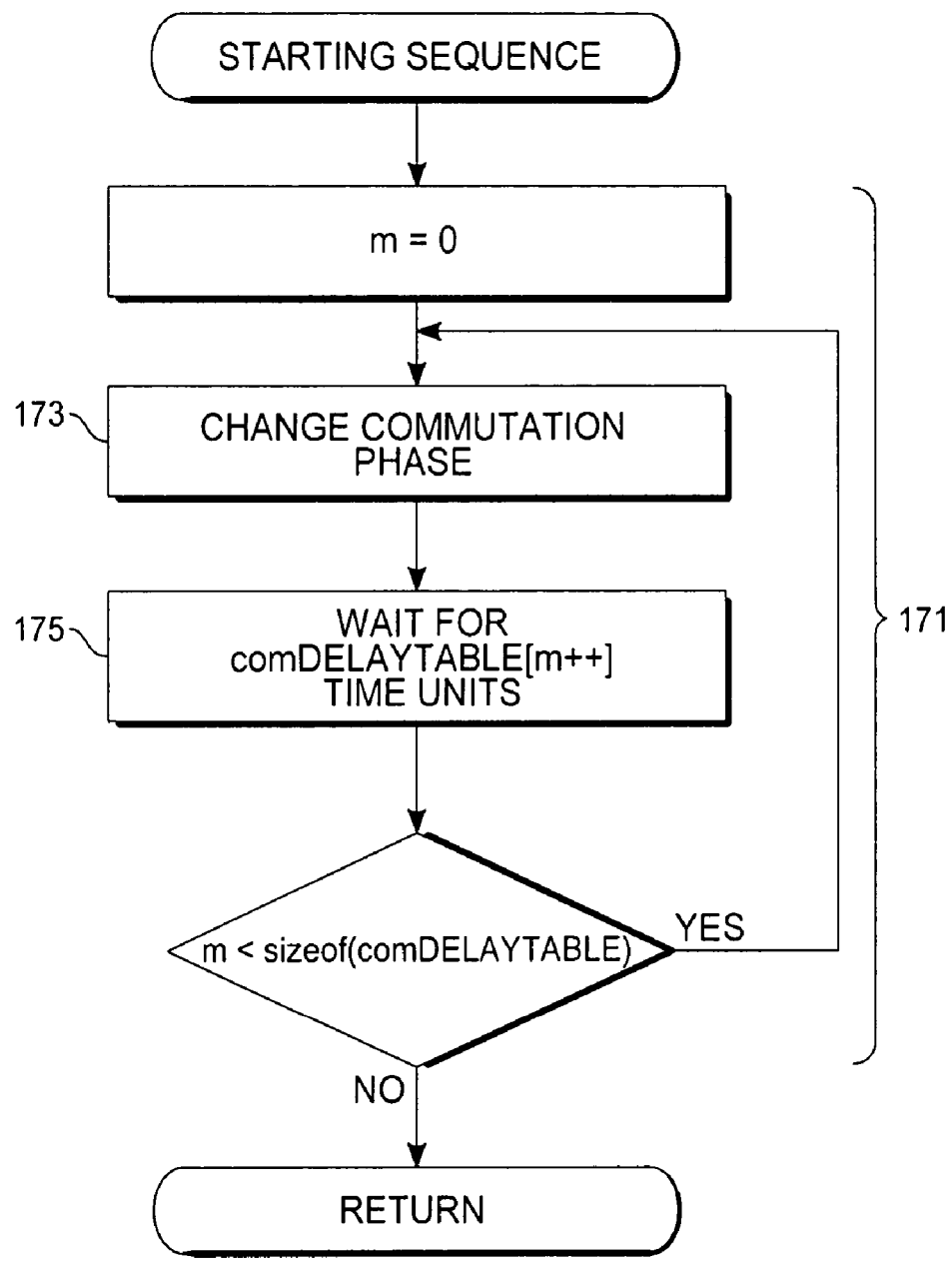
Fig._14

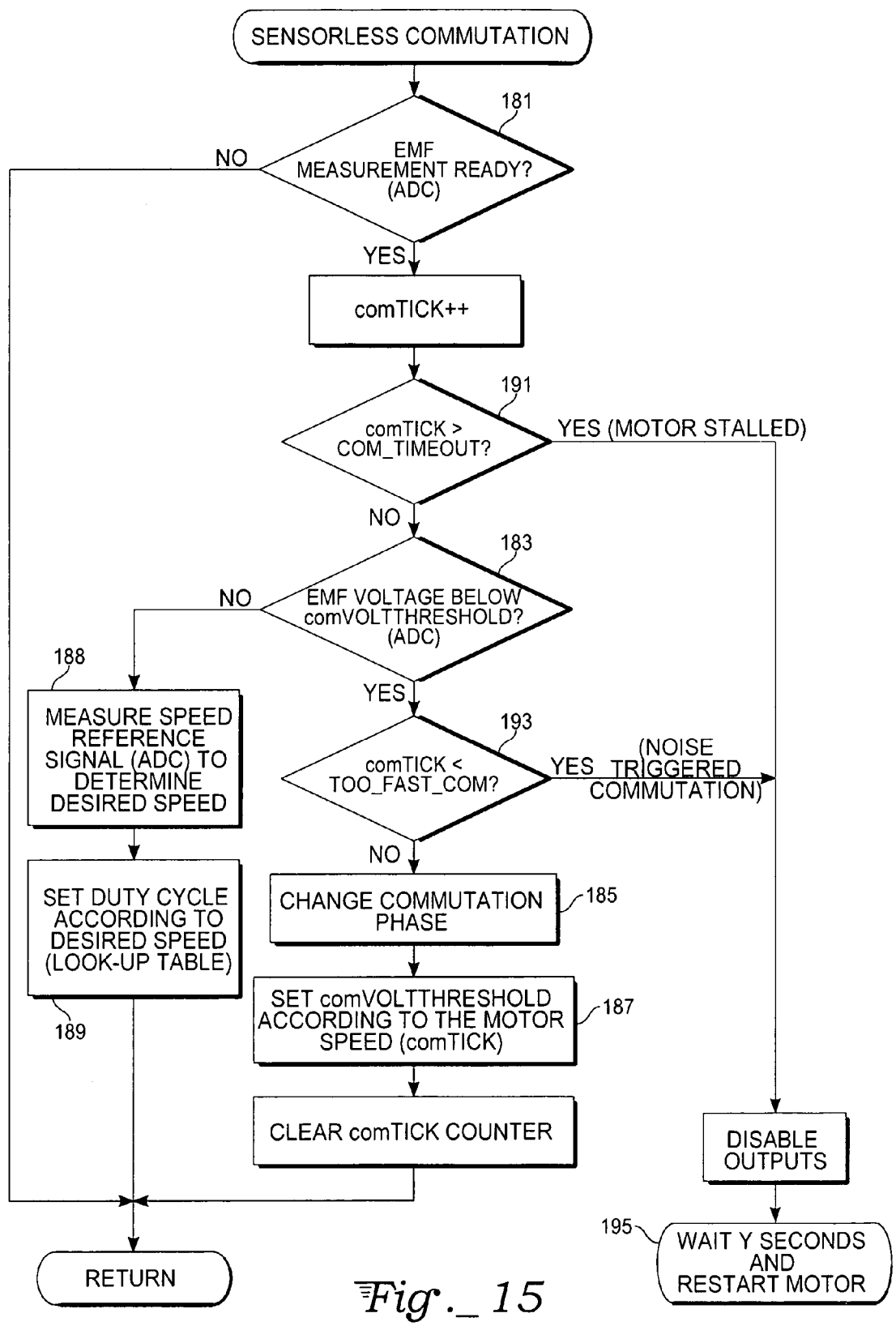
Fig._15

SENSORLESS CONTROL OF TWO-PHASE BRUSHLESS DC MOTOR

TECHNICAL FIELD

The present invention relates to two-phase brushless DC motors, and in particular to rotor position sensing and commutation control for such motors.

BACKGROUND ART

Two-phase brushless DC (BLDC) motors are widely used in fans for ventilating and cooling central processing units (CPUs), graphics processors, power supplies, and many other applications. An advantage of the BLDC motors is that they, compared to brushed DC motors, are lighter, accelerate faster, produce little electrical or acoustical noise, and require no maintenance (no brush wearing). The requirements for cooling fans are continuously increasing as the use of powerful cooling-requiring electronics are increasing. As more fans are installed in more products, the need for low-cost fan solutions is evident to keep the overall cost of end-products low. Further, as the number of fans in homes and offices is increased, the need to keep these fans as quiet and efficient as possible is also getting more pronounced. The characteristics of BLDC motors matches the requirements of fans very well.

BLDC motors comprise a rotor with permanent magnets driven by a stator with coils. The number of poles on the permanent magnets and the number of coils vary depending on the desired characteristics of the motor. FIGS. 1A and 1B illustrate a basic two-phase motor (phase 1 in FIG. 1A, phase 2 in FIG. 1B) with four magnetic rotor poles (two each of magnetic N and S) and four stator coils (SC1–SC4). Note that for fan motors, a typical arrangement has the stator physically located in the center and the rotor on the outside. The basic principal of operation is the same. The upper and lower coils (coils SC1 and SC2) are electrically connected to form a first set of coils, and the left and right coils (coils SC3 and SC4) are likewise electrically connected to form a second set of coils. In two-phase motors, the two sets of coils are not directly connected to each other at a center point, unlike three-phase motors.

A set of coils is active or energized, whenever a current flows through the active coils, causing a magnetic field to emerge that affects the rotor magnets. In two-phase motors, whenever one set of coils is active, the other set is passive. No drive current flows in the passive or unenergized coils to contribute a magnetic field that would affect the rotor magnets. The orientation of the rotor magnets relative to the stator coils determines when to energize a particular set of coils to get the desired motor rotation.

Applying current through coils SC1 and SC2 (energizing these coils) will push/pull the poles of the rotor magnets towards an alignment with the coils (Phase 1). Once rotating, the inertia of the rotor will ensure that the rotor is not only attracted to, but also passes, the active coils. As soon as the rotor magnets pass the active coils, the commutating must be changed so that the other set of coils (coils SC3 and SC4) are activated (Phase 2) and the rotation is thereby continued. If the commutation is made at the right moment, the magnetic fields generated by the coils are changed such that they never slow down the moving rotor. Alternatively, if the commutation were made too early or too late, a negative torque is produced for a short while, and thereby limiting the total torque and speed of the motor. It is therefore necessary to know the orientation of the rotor magnets relative to the coils in order to get maximum performance from the motor.

The commutation of two-phase BLDC motors is usually controlled by the use of Hall sensors to detect the orientation of the rotor. A Hall sensor is a magnetic switch responsive to the orientation of the magnetic field generated by the rotor magnets. The Hall sensor sets or clears its output dependent upon whether the rotor's north or south magnetic pole faces it. If the Hall sensor HS is placed halfway between coils SC2 and SC3, as seen in FIGS. 1A and 1B, then the Hall sensor HS changes its output when the rotor magnets align with the coils. Hall sensors allow a motor's control system to know when to commutate the stator coil (deactivating one set of coils and activating the other) in order to maintain the desired rotation. A down side to this rather simple arrangement is that the Hall sensor needs to be positioned accurately in order to provide reliable information to the motor controller. A Hall sensor is also a cost adder to an otherwise inexpensive motor.

A BLDC motor is highly influenced by its self-generated electromotive force (EMF). EMF is a voltage generated over an inductor (i.e., the stator coils) by a changing magnetic field (e.g., due to the turning of the rotor with its permanent magnetic poles). FIGS. 2A–2F and FIG. 3 illustrate the effect of the moving magnetic rotor poles N and S on the stator coil SC1. The resulting EMF voltage, shown in FIG. 3, has a waveform that depends upon the physical shape of the rotor magnets and coil ferro-core, seen here with a typical trapezoidal shape. The amplitude of the generated EMF depends upon the rate at which the magnetic field (as seen by the coil) changes, in this case by the speed of the motor. The EMF will, when the motor reaches a certain speed, be the same amplitude as, but in the opposite direction from, the drive voltage used to energize the coils. Because of this "Back EMF" (B-EMF) induced in the stator coils, there is a limit to the current flow through an energized coil, which is required to generate the magnetic field to cause rotor rotation. Hence there is a maximum speed of the motor for any given drive voltage.

For three-phase BLDC motors, commutation control methods based on sensorless feedback are common, where the motor's B-EMF is used to determine the rotor orientation. Physically, a three-phase motor uses a Y-configuration of three stator coils connected to a common center point, with two of the coils being active at any given moment during operation, and with a third coil not energized by a drive voltage and being considered as the passive coil for use as reference for measuring the generated B-EMF. Thus, in three-phase BLDC motors, one can measure the B-EMF in whichever coil is presently considered to be the passive coil relative to a center point between the three coils or relative to each other (the passive coil being effectively connected to a reference potential established between the two active coils). The result of this is that the moment of primary interest to commutating a three-phase motor is when the B-EMF changes polarity, i.e., the zero crossing of the signal.

It may be desired to control the speed of a motor. For example, in a cooling fan application a speed based on an external temperature would allow lower speeds (with corresponding reduction in power consumption and acoustical noise) whenever the temperature is relatively low, which could be increased to higher speeds as needed when the temperature becomes much higher. One way that motor speed might be controlled would be to adjust the operating voltage applied to the stator coils. However, very few systems, e.g., personal computers (PCs), can provide an adjustable operating voltage for their cooling fan motors. An additional complication of multi-speed motors is the response time needed to energize the stator coils. At high speeds, there is a phase lag between applying a drive voltage and obtaining the desired current flow through the coils. This phase lag may seriously affect the timing for commutation. At a single motor speed, the timing can be pre-adjusted to compensate. For multiple motor speeds, the adjustment becomes more complicated. For a simple PC cooling fan, one typically goes with a single-speed motor.

DISCLOSURE OF THE INVENTION

A control system is provided for a two-phase BLDC motor. The B-EMF signal over the two-phase motor's passive coil is used to determine when to perform the commutation of the current flow in the stator coils. An external speed reference is also supplied to the commutation control. Block (square-wave) commutation is used, together with an advance commutation technique to optimize the speed performance of the motor. The motor speed is controlled by a pulse width modulated (PWM) signal onto the commutation square-wave signal. A microcontroller is used to measure the EMF and control the commutation of the motor, and to measure an external speed reference that defines the desired speed of the motor.

In particular, a motor control system in accord with the present invention comprises (a) a two-phase brushless DC motor having a rotor with permanent magnet poles and having two sets of stator coils alternately magnetically driving the rotor, (b) a drive circuit coupled in switching relation to the sets of stator coils such that in successive commutation time intervals an alternately selected one of said sets of stator coils is coupled to and energized by a motor power supply voltage, the other unconnected set of stator coils constituting passive coils responsive to rotor motion to generate an electromotive force (EMF) voltage on the passive coils, and (c) a microcontroller coupled to receive and measure the EMF voltage on the passive coils and to determine commutation time intervals therefrom, the microcontroller also coupled to the drive circuit to control the switching of the selection of the energized set of stator coils.

The microcontroller determines commutation intervals by comparison of the measured EMF voltage with a threshold voltage, that may be a zero crossing value or alternatively may be a speed-dependent threshold value accessible from a look-up table for advance commutation at higher motor speeds. The microcontroller may include an up-down counter timer and a compare count. The compare count is determined by an external speed reference. Each match of the compare count may trigger a pulse transition for pulse-width modulated (PWM) driving of the stator coils, with a duty cycle that corresponds to the desired target speed indicated by the external speed reference.

BRIEF DESCRIPTION OF THE DRAWINGS

FIGS. 2A through 2F are schematic partial views of the motor of FIGS. 1A and 1B (only one of the stator coils SC1 is shown) at various stages of rotation.

FIG. 3 is a graph of the generated EMF voltage in the stator coil SC1 versus time as the rotor moves as in FIGS. 2A–2F.

FIG. 4 is a schematic block diagram showing a functional overview of the motor control system in accord with the present invention.

FIG. 5 is a simplified cross-sectional view of a typical two-phase motor design having tapered air gaps for a preferred rotation direction.

FIGS. 6A through 6D are timing graphs of EMF voltage (FIGS. 6A and 6B) and activation voltage (FIGS. 6C and 6D) on the respective stator coils SC1 (FIGS. 6A and 6C) and SC2 (FIGS. 6B and 6D) of a two-phase motor in accord with the present invention, illustrating block or square wave commutation of the motor.

FIGS. 7A through 7D are timing graphs of EMF voltage, activation voltage, and the resulting coil current at low and high motor speeds, respectively, for a zero crossing commutation threshold.

FIGS. 8A through 8C are timing graphs of EMF voltage, activation voltage, and coil current at high motor speeds, respectively, which illustrate the advance commutation technique.

FIGS. 9A and 9B are respective timing graphs of EMF voltage and activation voltage, illustrating pulse width modulation of the activation voltage for motor speed control.

FIG. 10 is a schematic block circuit diagram of an exemplary embodiment of a motor control system in accord with the present invention.

FIG. 11 is a timing diagram illustrating the operation of the timer/counter circuitry in the system of FIG. 10 in producing pulse-width modulated (PWM) coil driver control signals for the power stage in FIG. 10.

FIGS. 12–15 are flowcharts illustrating an exemplary microcontroller software routine for the motor control system of FIG. 10. FIG. 12 is an overview, while FIGS. 13–15 are respectively an initial pre-position routine, a start-up routine, and a sensorless commutation routine for motor.

BEST MODE FOR CARRYING OUT THE INVENTION

Figures 1A, 1B:
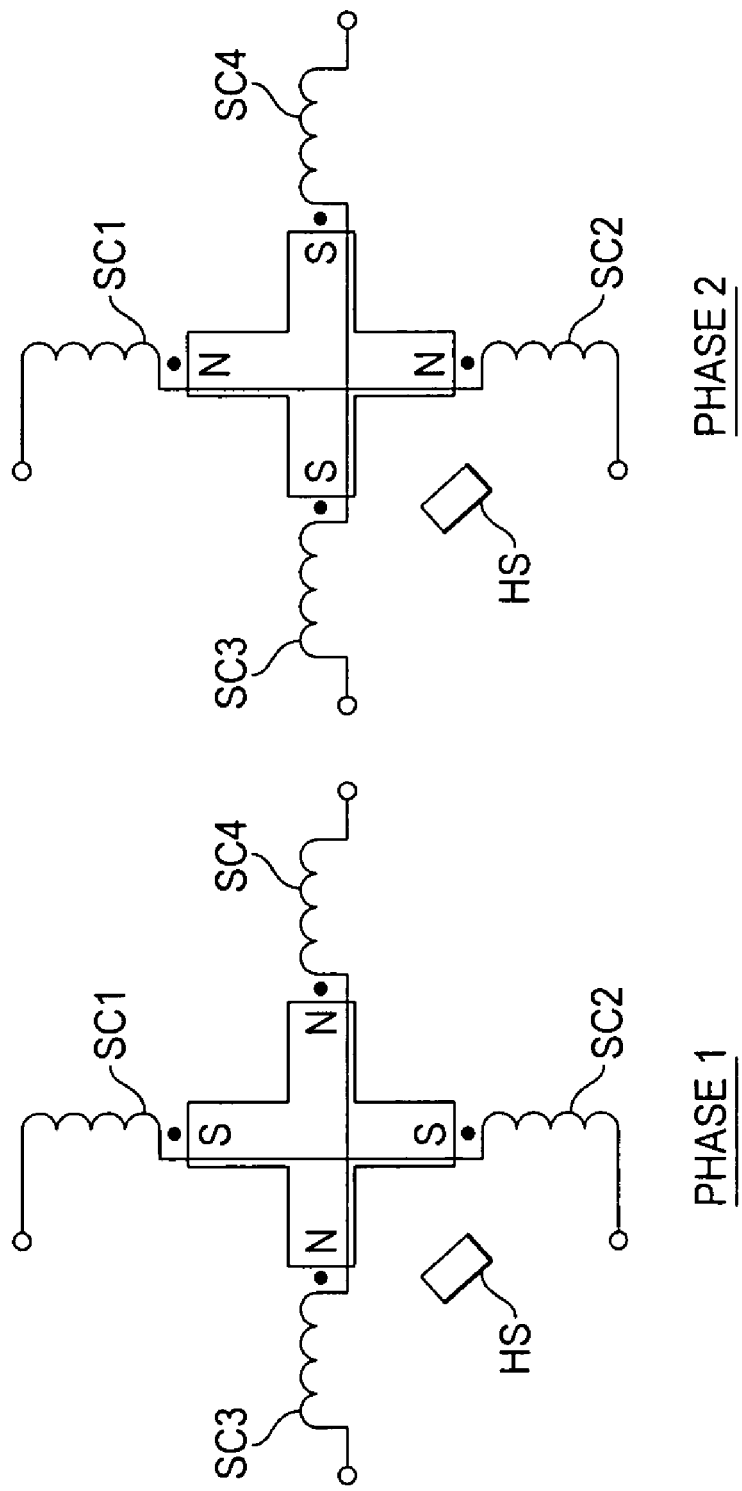
FIGS. 1A and 1B are schematic views illustrating the fundamental electromagnetic design of two-phase BLDC motors like those used in the present invention. The motor shown in FIGS. 1A and 1B includes a Hall sensor, as in the prior art, which becomes unnecessary with the present invention.

With reference to FIG. 4, an exemplary motor control system in accord with the present invention is provided to control a two-phase BLDC motor 11. Two inputs are seen: one input 13 is an external speed reference according to which the motor speed is adjusted to some target speed. The external reference can be, e.g., a temperature sensor, as for when the motor drives a cooling fan. An analogue temperature signal would be converted to corresponding digital reference speed data 14 using an internal analog-to-digital (ADC) circuit. Alternatively, the external reference can be a pulse width modulated (PWM) signal generated by a system host controller with varying duty cycle. As described later, the motor speed is controlled directly using a PWM signal as the activation voltage driving the stator coils, where different duty cycles produce different motor speeds. Any type of speed reference, temperature or otherwise, can be measured and used to establish a desired motor speed.

The other input is the B-EMF feedback signal 16 from the motor 11. As described below with reference to the EMF sensor 117 in FIG. 10, measuring the EMF of the passive coil requires only one analog signal 16 as feedback into the threshold detector 17. The feedback signal 16 is processed using voltage adjustment, measurement, and analog-to-digital conversion followed by a threshold detector 17 to produce timing control information 18 for the commutation. The EMF threshold detection 17 and the commutation control 19 are conducted by a hybrid analog-digital integrated circuit, such as microcontroller, application-specific integrated circuit (ASIC), or application-specific standard product (ASSP) integrated circuit. The commutation control circuitry 19 receives the reference speed and timing control information, and provides the drive signals 20 to the stator coils of the motor 11.

One consideration in the physical design of the motor 11 is to guarantee that the motor rotates in a desired direction. Rotation in the right direction is essential to obtain sufficient air flow in the correct direction, as most fan blades are optimized for rotation in one particular direction. As the fundamental electromagnetic form of a two-phase motor (FIGS. 1A and 1B) is neutral with respect to a particular rotation direction, most motors are designed to have a preferred direction of rotation by introducing a rotational asymmetry into its physical form. For example, a typical motor design for cooling fans includes tapered air gaps 21 between the rotor and stator, as seen in FIG. 5. This taper causes the magnetic field generated by the energized stator coils SC1–SC4 to be stronger where the air gap between the rotor magnets N and S and the stator ferro-core 23 is narrowest. The result is that the resting position of the rotor is a few degrees toward the next coil in the movement direction, causing a preferred starting direction to emerge. It should be clear, however, that improper commutation could result in rotation in a reverse direction, despite the motor's preferred direction.

Returning to FIG. 3, the present invention uses sensorless control (no Hall sensors) of a two-phase BLDC motor with the B-EMF signal generated in the stator coils as feedback for controlling the commutation. The EMF voltage is not only generated in the energized stator coils, limiting motor speed, but is also generated in the passive coils. The EMF waveform in the passive coil (e.g., as in FIG. 3) can be monitored and the voltage measurement used to determine the position of the rotor. Note that the EMF changes polarity whenever the rotor magnets are aligned with the coils (FIGS. 2A and 2F, and corresponding times A and F in FIG. 3). This information is used to control when to perform the commutation.

FIGS. 6A–6D illustrate the technique referred to as square-wave (or block) commutation. For illustration purposes, the representation separates the EMF and activation voltage signal components into different graphs (FIGS. 6A and 6B for the EMF components on respective stator coils SC1 and SC2; FIGS. 6C and 6D for the activation voltage signal driving the respective coils SC1 and SC2). In reality, the EMF is mixed with the activation voltage to give a composite signal.

In block commutation, the coil activation voltage is triggered directly by the zero crossing (polarity change) of the EMF voltage. Note that the EMF voltage is relative to the motor supply voltage, and that the EMF zero crossing therefore equals the motor supply voltage level in the present invention. The zero crossing is a common threshold for motor commutation, but other thresholds (e.g., just above low side or just below high side of the EMF signal) could be used, and in some applications may give better performance. The presence of noise in a given system and the ability to measure small threshold voltage levels may factor into the choice of commutation threshold. Response time of the coils is another factor that is important, and is discussed below with respect to the advance commutation technique.

The activation voltage waveform shown here, and used in most fans today, is a square wave. This square waveform produces the best performance in terms of highest speed. Rotational speed is the main performance parameter in fan applications. In other motor applications it may be desired to use a different commutation drive waveform to optimize some other performance factor, such as minimum torque ripple or minimum electrical noise.

With reference to FIGS. 7A–7D, in correctly determining when to commutate, the response time of the coils needs to be considered at high motor speeds. FIGS. 7A and 7B basically repeat the EMF voltage and activation voltage components from FIGS. 6B and 6D for easy reference. FIGS. 7C and 7D show the current flow through the corresponding coil at low and high motor speeds. (Note: the time scale for the low- and high-speed cases is normalized to common phase angles for comparison purposes. At high speed the period of the commutation cycle is shorter due to the higher rotational speed.) As seen in FIG. 7C, at low motor speeds, current through the coil is substantially in phase with the activation voltage applied to that coil. FIG. 7D reveals that, at high motor speeds, there is a significant phase lag between the current and voltage due to the inductance of the coils. Because it is the current flow through the stator coils that determines the strength and orientation of the magnetic field that turns the rotor, the phase lag means that there is a time interval 73 after each desired commutation time 71 (the EMF zero crossing in FIG. 7A) when the magnetic field still has the old orientation. This causes a drag on the rotor that impedes motor performance. As speed increases, the relative phase of the lag increases.

FIGS. 8A–8C show a solution to the phase lag problem, allowing higher motor speeds to be achieved. The idea is to advance the commutation to an earlier point in time until the stator current reverses polarity in synch with the EMF zero crossing. Instead of using the zero crossing to trigger the commutation change, the threshold is adjusted so that commutation is advanced. As seen in FIG. 8B, the activation voltage is switched at a time 82 that is in advance of the time 81 for the EMF voltage's (FIG. 8A) zero crossing. This gives extra time for the current in the stator coil to reverse polarity, as seen in FIG. 8C. In particular, the time intervals 83 after which the activation voltage has switched but the coil current has not yet reversed polarity are now advanced prior to the EMF zero crossing 81. The coil current now has its zero crossing or polarity reversal 84 at the same time as the EMF zero crossing 81. This ensures that the magnetic field generated by the coil current achieves the desired polarity at the desired times. The advancement of the commutation by the activation voltage may be achieved by changing the threshold measured for the EMF voltage. Instead of looking for EMF zero crossings, which is too late in view of the lag caused by the stator coil inductance, the commutation controller looks for another threshold voltage. This threshold will vary from zero or near zero for slow motor speeds up to a maximum absolute value that coincides with the highs and lows of the EMF voltage waveform. A look-up table memory for the controller may be used to define a relation between the motor speed and the threshold used for the advance commutation.

With reference to FIGS. 9A and 9B, in many motor applications it is desirable to control the speed of the motor, e.g., to reduce power consumption and acoustical noise while still achieving an adequate level of cooling by a fan. As noted above, the desired speed may depend upon an external reference, such as a measured temperature. For the present invention, an exemplary approach to speed control uses pulse width modulation (PWM) of the activation voltage applied to the stator coils. A microcontroller controls the activation voltage of the motor and can switch the voltage on and off in a series of pulses 91 during the activation period 93, as seen in FIG. 9B. (The example shown here is for a slow motor speed. For higher motor speeds, advance commutation would also be applied so that the activation period is moved earlier in time.) The duty cycle of the PWM output defines an average activation voltage for the coils. For example, FIG. 9B illustrates a 50% duty cycle, thereby providing an average activation voltage that is 50% of the operating voltage. Coil inductance will generally smooth out the effect of the pulsed activation voltage upon the coil current to the average value, so little if any micro-accelerations (acoustical vibrations) result in the rotor speed. Nevertheless, it is desirable that the base frequency (repetition rate) of the PWM signal be above the frequencies easily perceptible to the human ear (i.e., near or greater than about 20 kHz, although any rate above 15 kHz should be adequate), so that a user is less likely to hear the switching.

With reference to FIG. 10, an exemplary hardware implementation of the motor control system may include a microcontroller 101 with an internal ADC circuit block 103 and an internal timer circuit block 105. The ADC circuit block may have an I/O interface 107 associated with one or more ADC circuits, e.g., to receive and convert an external speed reference 109. The timer 105 may be used to apply the PWM speed control technique to the commutation of each set of stator coils.

The two-phase BLDC motor 111 has its stator coils 113 and 114 connected to a motor supply voltage $V_{motor}$ 115 and to an EMF sensing circuit 117 and a power stage 119. The EMF sensing circuit 117 is a voltage level adjuster that measures the relative voltage between the two sets of stator coils 113 and 144 across a voltage divider resistance network. Hence, the sensing circuit 117 provides a measurement of the EMF voltage of the passive coil. (The signal from the active coil works as a ground reference while measuring the EMF, as this measurement is only done while the active cell is connected to ground through the driving transistor). The measured EMF voltage is an analog signal that is supplied to the microcontroller 101 via an ADC0 circuit in the ADC block 103. By using a simple resistor network, it is possible to measure the EMF of the passive coil (regardless of which coil is actually passive) with only one analog input signal to the microcontroller. Alternatively, the EMF voltage may be sensed separately on each coil relative to the motor power supply or ground voltage, and with the ADC input channel being controlled and switched along with the power stage 109 so that it measures only the non-energized or passive coil.

In an exemplary implementation, the processing of an EMF measurement by the ADC0 is done in a timer interrupt service routine from the timer circuit 105. To ensure that the interrupt has sufficient time to process and evaluate the measurement, the ADC conversion time is set to approximately 10 µs.

The microcontroller 101 activates one or the other of the PWM timing circuits PWM0 or PWM1 in the timer block 105, in accord with the measured EMF voltage, the desired speed reference 109, and advance commutation information. The power stage 119 applies the PWM signal as a drive voltage to whichever of the stator coils 113 and 114 is active during the applicable time period. The power stage 119 may include inverting driver transistors 121 and 123 (e.g., N-channel FETs), coupled at their inputs to the respective PWM timing circuits PWM0 and PWM1, and acting as switches between the motor power supply, the applicable stator coil and ground, and thereby controlling the current flow through the connected coil.

Both active and passive stator coils are connected to the motor supply voltage $V_{motor}$. When an inverting driver transistor is open (i.e., when the PWM control signal=high), the corresponding coil is also connected through the open (conducting) transistor to ground, allowing current flow through that coil. This is the active (conducting) phase of the coil. The passive phase is when the transistor is closed (i.e., when PWM control signal=low), so that the coil is not actively conducting. The voltage over the passive coil is determined by the generated EMF voltage potential relative to the motor supply voltage $V_{motor}$. The moving rotor magnets induce an EMF voltage, which is seen in the passive phase of the stator coil as a substantially sinusoidal/trapezoidal voltage waveform. The waveform is relative to the $V_{motor}$ voltage, but also affected by the active coil during acceleration and deceleration as the active coil provides a connection to GND (for shorter or longer time, depending on the PWM duty cycle). Running at steady speed the EMF in the passive coil has some magnitude, relative to the alternating magnetic flux caused by the rotor magnets, but also by the driver switching for the active coil. When accelerating (or decelerating) the changed PWM duty cycle for driving the active coil affects the EMF current flow in the passive. This results in variations in the EMF voltage, which again affects what EMF detection threshold that should be used to commutation at the right moment. (A method to handle this problem will be described later.)

Sensorless control may impose a low speed limit to the motor. At very low motor speeds, the EMF signal has both low amplitude (possibly near the resolution limit of the ADC circuit in the microcontroller) and low signal-to-noise ratio. It is therefore more difficult to use the EMF signal for sensorless control at very low motor speeds. This is generally not a problem for cooling fan applications, since operation at very low speed is not required to reach an adequately low power consumption and low acoustical noise characteristic. However, other motor applications that require very low speed operations may require sensors, e.g., Hall sensors, be included.

The two PWM channels (PWM0 and PWM1 in FIG. 10) that are used to control the motor speed may be realized in the form of an up-down timer counter with two PWM channels. The timer generates three events: two compare events that set or clear the corresponding PWM outputs and one overflow interrupt event.

The up-down counting and the resulting PWM output can be seen in FIG. 11. The digital values sequentially generated by the up-down counter are represented in analog form in FIG. 11 as a sawtooth waveform. The counter output is compared to output compare values OC0/OC1 (both equal) related to the speed of the motor and obtained from the ADC portion of the microcontroller. Depending on the particular embodiment, the measured external reference signal may be directly used as the compare count, or some transfer function (implemented as a look-up table) may be used to map the measured external reference to a compare count value. The output compare value OC0/OC1 are count compare values that define the duty cycle of the PW0 and PW1 control signals to the driver circuit. A PWM output transition is produced whenever the counter output matches the reference value, e.g., at times 131 and 132. Different reference values will result in different duty cycles for the PWM output. The PWM control signals open the driving transistors on output HIGH. Low duty cycles (counter values near 0) corresponding to very low motor speeds should not be used, both because EMF sensing is difficult at low voltage amplitudes. The reference value may therefore have an allowed minimum in practice, according to the ADC resolution and signal-to-noise tolerances of the system.

One reason for using an up-down mode for the counter is that the timer overflow interrupts 139 that are generated at the bottom of the count (timer value=0) always occur at moments when the PWM output is certainly not switching. If the ADC0 sampling for a new EMF value is made at this time, the ADC0 measurement of the EMF value is unlikely to be affected by switching noise. The speed reference may be sampled (e.g., by analog to digital conversion) at any time, as it is not affected by the switching noise. The overflow interrupt may also be used to trigger execution of an interrupt service routine by the microcontroller in which the position of the rotor is evaluated and the commutation is changed if the conditions are right (i.e., if the measured EMF voltage received from the ADC0 is passing a given threshold).

In order to ensure that the PWM base frequency is above audible frequencies the frequency of the timer clock should be sufficiently high. The base frequency of the timer should be at least 15 kHz. For example, an exemplary timer embodiment with a 9.6 MHz clock, a default top value of 255 (for an 8-bit counter), and operating in up-down mode, will provide a base frequency of 9.6 MHz/256/2=18.75 kHz. This is generally acceptable.

Figure 12:
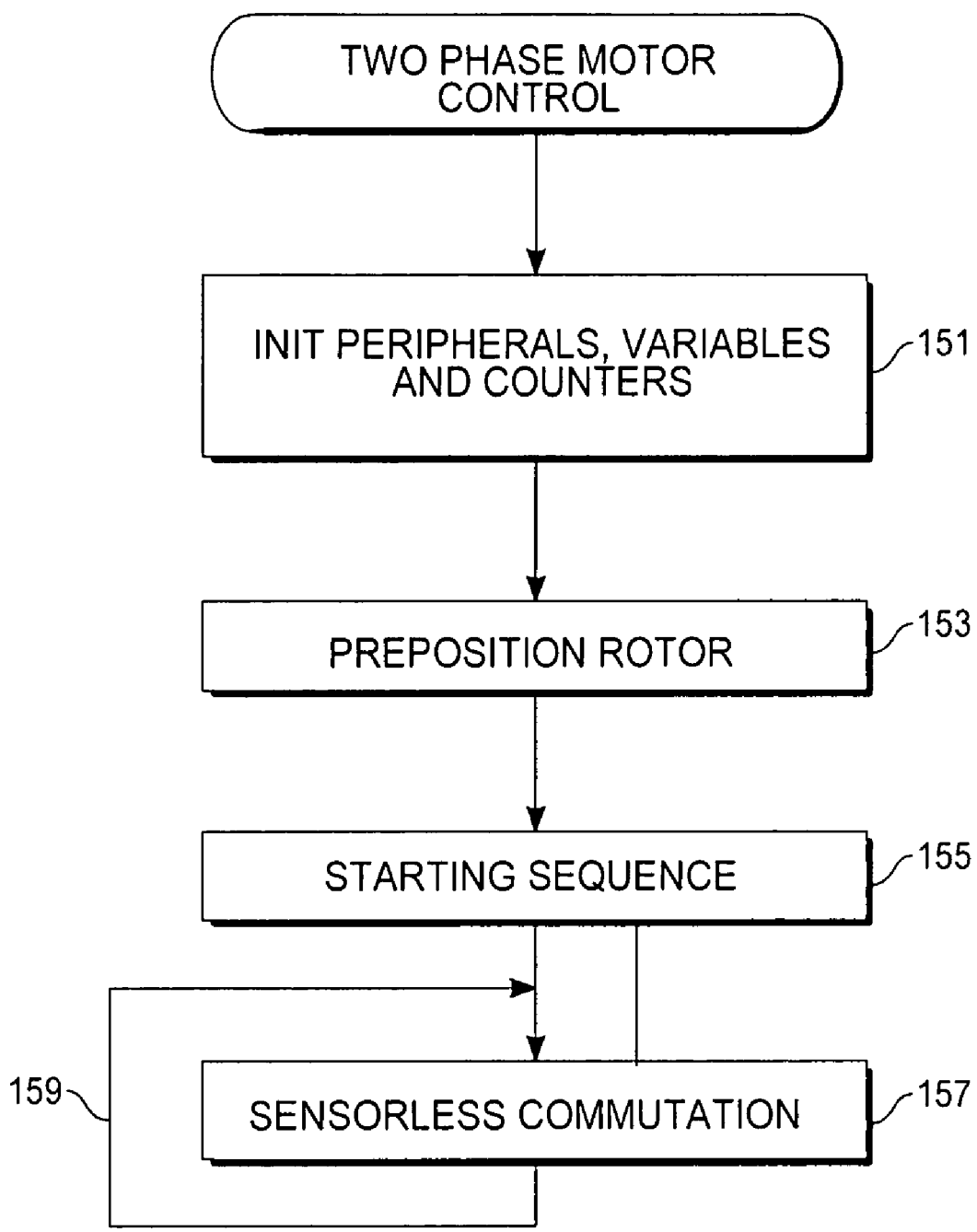

With reference to FIG. 12, a software implementation for the two-phase motor control begins by initializing (151) peripherals, variables and counters in the microcontroller. Then the rotor is pre-positioned (153), as further detailed below with reference to FIG. 13. Next, a starting sequence (155) is performed, as further detailed below with reference to FIG. 14. And finally, sensorless commutation (157) of the motor is performed repeatedly (159) while the motor is running, as further detailed with reference to FIG. 15.

Figure 13:
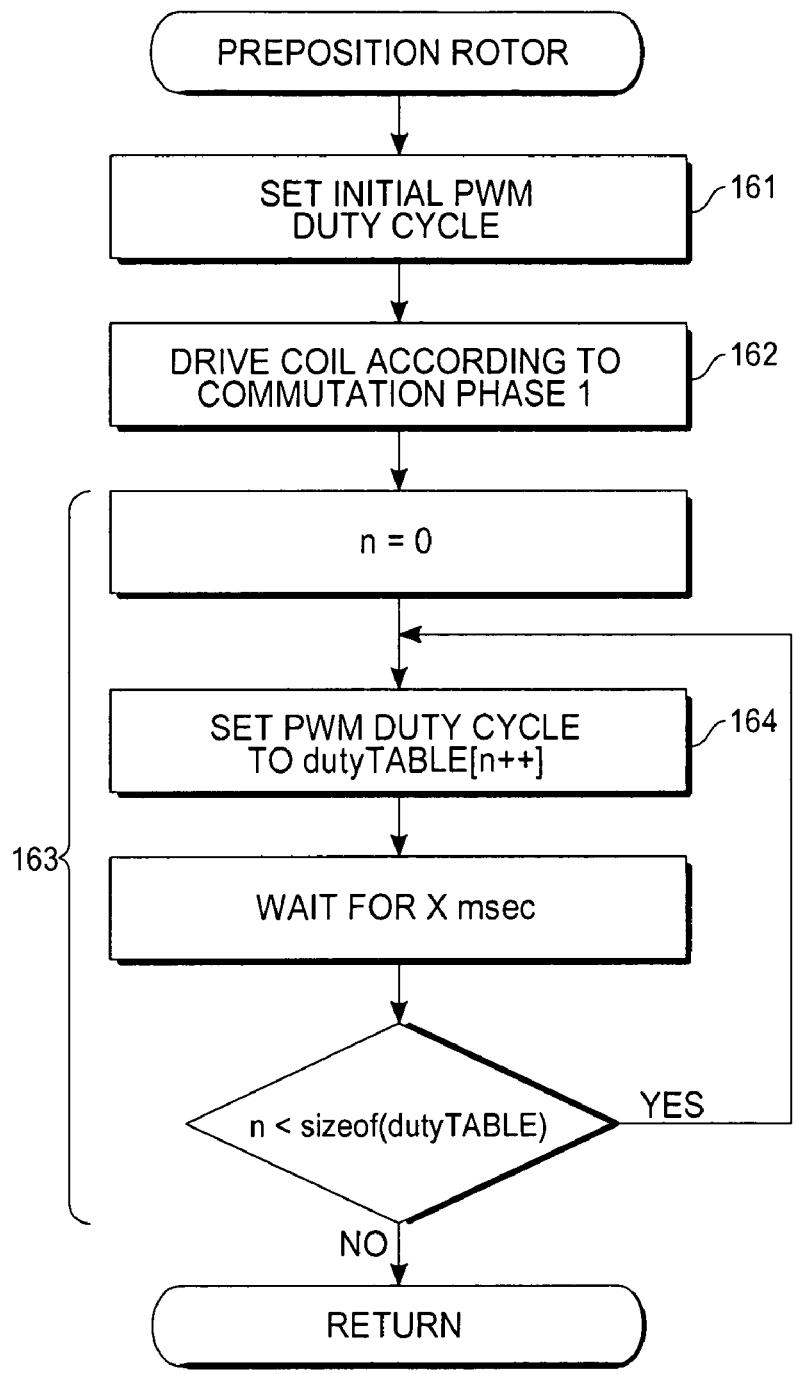

Turning now to FIG. 13, common to all sensorless implementations of BLDC motor control, the starting is done with no usable feedback and the position of the rotor is not known in advance. If care is not taken when starting the motor, the motor may start rotating in the wrong direction. One way to handle this is to force the rotor magnets to a known position before starting the commutation. This may be achieved simply by energizing one set of stator coils with current, then waiting for the rotor to move to a known position in alignment with the activated coils.

The amplitude of the current will control how fast the rotor will arrive at the desired position. One must also consider that the magnetic field generated by the coil will not trap the rotor in a fixed position instantaneously. Rather, the mechanical response and settling time must be taken into account. Depending on the strength of the rotor magnets, the field generated by the coil, and the mass (inertia) of the rotor, the settling time can be up to a few seconds. The exemplary implementation shown in FIG. 13 increases the activation voltage according to a predefined table. It is therefore possible to adapt the positioning to the particular characteristics of the motor in order to minimize the time required to reach and settle at the desired initial position, such as by avoiding overshooting of the target position. According to this technique, an initial PWM duty cycle is set (161) and the selected stator coil (e.g., the coil corresponding to commutation phase 1) is first driven (162) according to that initial PWM duty cycle. Then the drive process loops (163) through a sequence (n=0 to size of the duty table) of different PWM duty cycles (164) for some preset duration (X msec) for each pass in the loop.

Once pre-positioning of the rotor is complete, the rotor position is known and it is possible to start the motor using a predefined starting sequence, such as that shown in FIG. 14. The starting sequence used with sensorless control of BLDC motors depends upon the expected load upon the motor. In cases where the starting load varies greatly, sensor-based control is often preferred. However, in cooling fan applications, the mass (inertia) of the rotor and fan blades, and hence the starting load, is known, making this application well suited for sensorless control. Changing the commutation to the opposite coil set, the rotor will move in the desired direction. With sufficient information about the motor acceleration characteristics, the time between commutation changes can be calculated. Alternatively, the mechanical response of the motor can be determined experimentally by measuring the EMF voltage across the coils with an oscilloscope. In either case, once the starting characteristics have been determined, the start-up sequence can be implemented with a look-up table specifying the delays between commutation changes while the motor accelerates to a certain speed. Hence, the starting sequence is seen to be a repeated open loop 171 (from m=0 to the size of the commutation delay table) of commutation phase changes (173) followed by an inter-commutation delay period (175) defined in the look-up table.

With reference to FIG. 15, once the starting sequence is completed and the motor is moving at steady speed, commutation control is performed in a closed loop using the EMF voltage over the passive coil (183) to determine when to change the commutation (185). As noted previously, a square wave (block) commutation scheme may be used, with advance commutation and with speed control using PWM duty cycle (189).

An internal ADC of the microcontroller is used to measure the EMF voltage (188). Sampling of the ADC input channel is controlled by the timer overflow interrupt routine. In particular, timer overflow (recall the above description with reference to FIG. 11) triggers an ADC conversion and that result is available soon after entering the interrupt routine.

The measured EMF voltage is compared to a speed-dependent threshold. However, since the EMF voltage across the non-energized coil may spike when the coil is switched off, the detection algorithm disregards the first few (e.g., 5 to 10) samples after a changed commutation (181). Once this timeout period is over, the threshold detection algorithm controls when to change the next commutation (183). A hysteresis factor can be included in the threshold if much noise is present. When the EMF has passed below the threshold voltage, the commutation is changed to the opposite coil set (185).

The threshold is adapted to the speed of the motor for better performance. If the motor is running at high speeds, the EMF voltage amplitude is high; while if the motor is running at low speeds, the EMF voltage amplitude is low. Likewise, the use of a speed-dependent threshold allows advance commutation to account for the stator coils' delayed current response. The threshold is therefore updated (187) to correspond to the motor speed.

The EMF is not only affected by the speed of the motor, but also the acceleration or deceleration of the motor. Three solutions can be suggested to handle this so that the EMF detection threshold is correct during acceleration and deceleration also: (1) the Threshold could be varied during acceleration and deceleration to compensate for the EMF voltage level variations. This is a fairly complex solution the required larger threshold tables and a robust method to detect the acceleration ratio (therefore not a desirable solution); (2) add separate rectifier diodes on both the coils. This will provide a good solution for fans that requires fast acceleration/deceleration, but comes at the expense of an additional rectifier diode; and (3) limiting the acceleration/deceleration of the fan to keep the general EMF thresholds valid during acceleration and deceleration. Solution (3) is implemented by only changing the PWM duty cycle in small steps. If the compare should be increased from e.g., 90 to 200, the compare count is increased by one unit every PWM cycle until the desired value have been reached. Might be desired to change this ratio in some implementations, depending on the motor characteristics.

An external speed reference may be implemented as an analog input to another ADC input that the microcontroller evaluates (188) to determine the desired motor speed. Two PWM channels are used to generate the commutation signal to the motor's two sets of stator coils. By varying the duty cycle of the PWM signals (189), the average voltage over the coils and thereby the motor speed can be controlled.

Stall situations are detected by measuring the time between commutations. A stall condition is defined to be when the rotation speed of the running motor drops below a given threshold speed. If the time between EMF zero crossings are too large (191), the microcontroller software assumes that the motor has stalled. Additionally, when the motor appears to have a higher speed then actually possible (EMF zero crossing interval too small, step 193), that condition is assumed to be due to that the motor is oscillating between two stator poles, triggering false detections that are actually from a motor stall. In either case, once a stall is recognized, the motor is stopped. A watchdog timeout interval may be used before restarting the motor. When restarting, the startup sequence (195) is run again. It is possible to define a maximum number of times that a motor is allowed to stall and then trigger an external alert if that limit is reached.

What is claimed is:

1. An integrated circuit particularly configured for control of a two-phase brushless DC motor having a rotor with permanent magnet poles and a stator with two sets of stator coils coupled to a drive circuit, end with the drive circuit in switching relation to the sets of stator coils to alternately energize the respective sets, of stator coils, the two sets of stator coils connected in common to a motor supply voltage and connected through separate switches of the drive circuit to ground, the integrated circuit comprising:
    EMF circuitry coupled to receive and sample an electromotive force (EMF) signal corresponding to an EMF voltage generated in response to rotor motion upon whichever set of stator coils as not energized at any given sampling time, the EMF circuitry having a voltage divider resistance network connected across the two sets of stator coils to provide a measure of EMF voltage relative to the motor supply voltage of whichever set of stator coils is not energized, with the energized set of stator coils serving as a ground reference through a conducting switch of the drive circuit; and
    commutation control circuitry responsive to the sampled EMF signal to provide switching control signals to the drive circuit, such that commutation times are determined by the EMF voltage on the non-energized stator coils.

2. The integrated circuit of claim 1, wherein the EMF circuitry comprises analog-to-digital conversion circuitry that is coupled to a resistive network across the two sets of stator coils so as to receive the EMF signal from the resistive network, the analog-to-digital conversion circuitry configured to sample the received EMF signal and provide a digital measurement of the EMF signal to the commutation control circuitry.

3. The integrated circuit of claim 1, wherein the commutation control circuitry determines commutation times by comparing the sampled EMF signal with a threshold value.

4. The integrated circuit of claim 3, wherein the threshold value is dependent upon a desired target motor speed, the speed-dependent threshold value being obtained by the commutation control circuitry from a look-up table.

5. The integrated circuit of claim 1, further comprising:
    pulse width modulation (PWM) circuitry forming a part of said commutation control circuitry, the PWM circuitry being responsive to a external motor speed reference signal designating a desired target motor sped, the PWM circuitry configured to superimpose a PWM upon the switching control signals provided to the drive circuit, with a PWM duty cycle corresponding to the desired target motor speed.

6. The integrated circuit of claim 5, wherein the PWM circuitry includes an up-down counter timer circuit and compare circuitry for comparing a count value of the timer circuit, with a compare value corresponding to the desired target motor speed, each match of the count value with the compare value triggering a PWM transition upon the switching control signals.

7. A motor control system, comprising:
    two-phase brushless DC motor having a rotor with permanent magnet poles and having a stator with two sets of stator coils configured to alternately magnetically drive said rotor, the two sets of stator coils connected in common to a motor supply voltage;
    a drive circuit coupled in switching relation to said sets of stator coils such that in successive commutation time intervals an alternately selected one of said sets of stator coils is coupled to ground and thereby energized by the motor power supply voltage, the other set of stator coils unconnected to ground constituting passive coils responsive to rotor motion to generate an electromotive force (EMF) voltage on said passive coils; and
    a microcontroller coupled to receive and measure the EMF voltage on the passive coils using EMF sensing circuitry and to determine commutation time intervals therefrom, the EMF sensing circuitry having a voltage divider resistance network connected across the two sets of stator coils to provide a measure of EMF voltage on the passive coils relative to the motor supply voltage with the energized set of stator coils serving as a ground reference for the measurement, the microcontroller also coupled to said drive circuit to control the switching of the selection of the energized set of stator coils.

8. The motor control system of claim 7 wherein the microcontroller includes analog-to-digital conversion circuitry to convert any received analog EMF voltage to digital form.

9. The motor control system of claim 7 wherein the microcontroller determines commutation time intervals by comparison of the measured EMF voltage with a threshold voltage.

10. The motor control system of claim 9 wherein the threshold voltage is dependent upon a desired target motor speed.

11. The motor control system of claim 7 wherein the microcontroller is further coupled to receive an external motor speed reference signal designating a desired target motor speed, the microcontroller using the external motor speed reference signal to control the switching by the drive circuit.

12. The motor control system of claim 11 wherein the microcontroller provides a pulse width modulated (PWM) control of the switching by the drive circuit, with a duty cycle of the PWM switching control corresponding to the desired target motor speed.

13. The motor control system of claim 12 wherein the microcontroller includes an up-down counter timer circuit, the external motor speed reference signal providing a reference value for comparison with a count by said timer circuit, each occurrence of a match of the reference value with the count triggering a pulse transition of the PWM switching control.

14. The motor control system of claim 13 wherein a zero count by said timer generates an overflow interrupt state that triggers a sampling of said EMF voltage by said microcontroller.

15. The motor control system of claim 7 wherein the microcontroller is further coupled to a look-up table memory.

16. The motor control system of claim 15 wherein the look-up table memory stores speed-dependent threshold values for comparison with the measured EMF voltage.

17. A motor control system, comprising:
a two-phase brushless DC motor having a rotor with permanent magnet poles arid having two sets of stator coils configured to alternately magnetically drive said rotor;
a drive circuit coupled in switching relation to said sets of stator coils such that in successive commutation time intervals an alternately selected one of said sets of stator coils is coupled to and energized by a motor power supply voltage, the other unconnected set of stator coils constituting passive coils responsive to rotor motion to generate an electromotive force (EMF) voltage on said passive coils; and
a microcontroller including an analog-to-digital conversion circuit block coupled to receive and measure the EMF voltage on the passive coils and to convert it to digital form for comparison with a speed-dependent threshold value, wherein the microcontroller is coupled to a look-up table storing the speed-dependent threshold values, the microcontroller further configured to establish commutation times based on said comparison of the measured EMF voltage with the speed-dependent threshold, value, the microcontroller also including an up-down counter timer circuit, the microcontroller coupled to receive an external motor speed reference and convert it to compare count value for comparison with a count by said timer, each match of the count with the speed reference-dependent compare count value triggering a pulse transition of a pulse-width modulated (PWM) drive control signal, the PWM motor drive control signal with a duty cycle dependent upon the external motor speed reference, the PWM motor drive control signal coupled to the drive circuit to control the energized set of stator coils.

18. The motor control system of claim 17 wherein a zero count by said timer generates an overflow interrupt state that triggers a sampling of said EMF voltage by said microcontroller.

19. The motor control system of claim 17 wherein the microcontroller operates in accord with a software procedure that includes a pre-positioning routine, the pre-positioning routine driving one set of stator coils until a rotor has settled at a known position.

20. The motor control system of claim 19 wherein the microcontroller is coupled to a look-up table storing PWM duty cycle comparison values for said counter timer to control driving of the stator coils during the pre-positioning routine.

21. The motor control system of claim 19 wherein the software procedure further includes a starting routine, the starting routine alternately driving the stator coils for pro-established commutation times stored in a look-up table accessible to said microcontroller.

* * * * *